May 13, 1952    M. R. LAING ET AL    2,596,698
SYNCHRONIZING ARRANGEMENT
Filed June 10, 1948
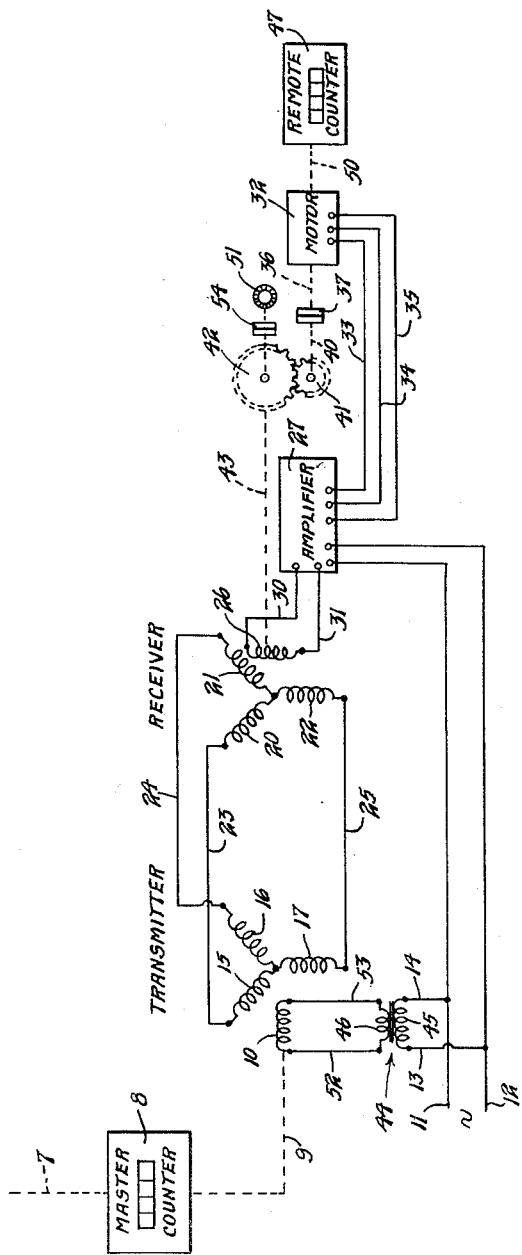
Inventors
MARVIN R. LAING
WATT MYERS
By George H. Fisher
Attorney Patented May 13, 1952

2,596,698

UNITED STATES PATENT OFFICE 2,596,698

SYNCHRONIZING ARRANGEMENT

Marvin R. Laing and Watt Myers, Minneapolis, Minn., assignors to Minneapolis-Honeywell Regulator Company, Minneapolis, Minn., a corporation of Delaware Application June 10, 1948, Serial No. 32,208

4 Claims. (Cl. 318—24)

This invention is concerned with synchronizing arrangements and more particularly with synchronizing arrangements for telemetric systems wherein indicators or other members connected to the transmitter and receiver of said telemetric system may get out of synchronism with each other. It is therefore an object of this invention to devise an arrangement whereby members attached to the transmitter and receiver of a telemetric system may be synchronized rapidly and easily.

A further object of the invention is to devise such a system whereby a manual control is utilized to unbalance a telemetric system to cause rotation of the member attached to the receiver.

Another object is to devise such a telemetric system whereby a manually controlled clutching means is placed between the receiver rotor and the motor means used for rebalancing the telemetric system for the purpose of preventing the motor means from rebalancing the system upon operation of the manual control.

Means for accomplishing the above-mentioned objects are explained in detail hereinafter and may be perused in conjunction with the single figure of the drawing showing a telemetric system utilizing the features of the invention.

The drawing shows a mechanical shaft 7, driven by a source of a signal not shown, for rotating the master counter 8. A second mechanical connection 9 driven by the mechanical shaft 7 extends from the master counter 8 to a rotor 10 comprising part of a transmitter in an "Autosyn" system.

The rotor 10 is energized from a pair of power leads 11 and 12 through a transformer 44 having its primary 45 connected to leads 11 and 12 through conductors 13 and 14 and its secondary 46 connected to the rotor 10 through leads 52 and 53. The secondary of the "Autosyn" transmitter is a three winding stator composed of windings 15, 16 and 17 connected together at a common junction.

The stator windings 15, 16 and 17 are connected to corresponding stator windings 20, 21 and 22 in the "Autosyn" receiver unit by electrical connections 23, 24 and 25 respectively. The receiver rotor 26 is connected to an amplifier 27 through leads 30 and 31.

With the relative positions of the two rotors 10 and 26 as shown in the drawing there will be no signal output from the "Autosyn" system.

The amplifier 27 is energized from power leads 11 and 12. The output of amplifier 27 is reversible in phase and is fed to a reversible motor 32 through leads 33, 34 and 35. The amplifier and motor combination may be any such combination wherein the amplifier is able to take a signal input of reversible phase, amplify it and send the output, also of reversible phase, to a reversible motor to energize the motor. Such a combination is disclosed in an Upton patent, 2,423,534.

The motor 32 operates two mechanical shafts 36 and 50. Shaft 50 operates to rotate remote counter 47 at the same speed as mechanical shaft 7 operates the master counter 8.

Shaft 36 operates from motor 32 through a clutch 37 to drive a mechanical connection 40 to actuate a gear train shown composed of gears 41 and 42. Rotation of gear 42 rotates mechanical shaft 43 to rotate rotor 26 in the "Autosyn" receiver. On the opposite end of mechanical shaft 43 from the rotor 26 is a manual handle 51 which is separate from clutch 37 and is pushed in to engage gear 42.

The clutch 37 is a friction clutch and is so shown. A second clutch 54 may be placed between the mechanical shaft 43 and manual handle 51 to prevent the handle 51 from normally rotating with shaft 43. A type of clutch which would answer this purpose would be a dog clutch. This clutch has a spring, not shown, which the handle 51 must be pushed against to make the mechanical connection to shaft 43 and which releases the connection when the handle is released.

The operation of this circuit is as follows. With the circuit as shown and no signal operating to rotate shaft 7 the rotors 10 and 26 are electrically displaced by 90° so that there is no signal output from rotor 26 of the "Autosyn" receiver and thus no error signal to be amplified by amplifier 27 to energize motor 32 and as a result the entire system is at rest.

Upon rotation of shaft 7, however, the master counter 8 will be rotated as will rotor 10 of the transmitter "Autosyn." This will cause a displacement between the relative position of rotors 10 and 26 and will induce a signal in rotor 26 which will be sent to amplifier 27. This signal will be amplified and sent to motor 32 to energize the motor in one direction or the other depending upon the phase of the signal. Energization of motor 32 will cause the remote counter 47 to rotate in synchronism with the master counter 8. The motor 32 will also cause operation of the gear train and the mechanical shaft 43 to cause the rotor 26 to follow rotor 10.

When rotor 10 ceases to rotate, rotor 26 will again be in a position 90° from the position of rotor 10 and the system will come to rest.

As long as the system is completely energized the remote counter and the master counter will remain in synchronism when a mechanical rotation signal is sent through the shaft 7. If, however, while the entire system is deenergized, rotation of shaft 7 occurs, it will cause rotation of master counter 8 while the remote counter will not be rotated. As a result the two counters will get out of synchronism.

If the two counters are out of synchronism they may be resynchronized in the following manner.

With the master counter at rest, that is, with no signal input into the system the manual handle 51 is pushed in to engage the dog clutch and then the handle 51 is rotated slightly in the proper direction so as to rotate the rotor 26 slightly with respect to rotor 10 and thus cause a signal of the proper phase to be induced in rotor 26.

This signal from rotor 26 is amplified through amplifier 27 and sent to motor 32. The resulting energization of motor 32 causes operation of remote counter 47 through shaft 50. The motor 32 also attempts to operate the gear train through clutch 37 to rotate mechanical shaft 43 to bring the rotor 26 back to a zero signal position. With the manual handle 51 being held in such position that a signal continues to be induced in rotor 26 the clutch 37 is caused to slip and the motor 32 is ineffective upon rotor 26.

When the two counters are again in synchronism the handle 51 is released and the motor 32 drives rotor 26 into a zero signal position.

It is understood, of course, that movement out of rest position of rotor 26 by the manual handle 51 in one direction causes the remote counter 47 to be actuated in one direction while movement out of rest position of rotor 26 by the manual handle 51 in the opposite direction causes the remote counter 47 to be rotated in the other direction. This is because the phase of the signal sent to amplifier 27 depends upon the direction of unbalance of the "Autosyn" system.

Thus it can be seen that the circuit shown and described provides an effective method for achieving the objects set out hereinabove in this specification.

It is to be understood that this invention is not intended to be limited to the particular telemetric system shown but that it is equally adaptable to any system wherein a clutch which may be controlled manually may be positioned between the means for rebalancing and the means to be rebalanced. The invention is to be further construed as being limited only to the extent of the claims hereafter appended.

We claim as our invention:

1. In combination: telemetric signal apparatus comprising a transmitter having a movable element, a receiver having a movable element, and motor means; load means; means connecting said motor means to said load means; means connecting said telemetric apparatus to said motor means so that said motor means is effective to drive said load means whenever said telemetric apparatus is unbalanced by movement of the movable element of said transmitter; yieldable friction clutching means of the type which slips when the movement of the driven member is retarded by more than a predetermined force; means connecting said motor means to said movable element of said receiver through said clutching means so that normally said motor means is effective to position said movable element to rebalance said apparatus; and a member designed to be manually actuated and connected to said movable element of said receiver so that upon said member being moved and held, said telemetric apparatus is unbalanced to cause said motor means to drive said load means and said clutching means is slipped so that said motor means is prevented from operating said receiver through said clutch to rebalance said apparatus.

2. In combination: telemetric signal apparatus comprising a transmitter having a movable element, a receiver having a movable element, and motor means; load means; means connecting said motor means to said load means; means connecting said telemetric apparatus to said motor means so that said motor means is effective to drive said load means whenever said telemetric apparatus is unbalanced by movement of the movable element of said transmitter; first yieldable friction clutching means of the type which slips when the movement of the driven member is retarded by more than a predetermined force; means connecting said motor means to said movable element of said receiver through said first clutching means so that normally said motor means is effective to position said movable element to rebalance said apparatus; second non-yieldable clutching means; and a member designed to be manually actuated and connected to said movable element of said receiver through said second clutching means so that upon said member being moved and held, said telemetric apparatus is unbalanced to cause said motor means to drive said load means and said first clutching means is slipped so that said motor means is prevented from operating said receiver through said first clutching means to rebalance said apparatus.

3. In combination: telemetric signal apparatus comprising a transmitter having a movable element, a receiver having a movable element, and motor means; a master counter; means driving said transmitter in synchronism with said master counter; load means comprising a remote counter; means connecting said motor means to said remote counter; means connecting said telemetric apparatus to said motor means so that said motor means is effective to drive said remote counter whenever said telemetric apparatus is unbalanced by movement of the movable element of said transmitter; yieldable friction clutching means of the type which slips when the movement of the driven member is retarded by more than a predetermined force; means connecting said motor means to said movable element of said receiver through said clutching means so that normally said motor means is effective to position said movable element to rebalance said apparatus; and a member designed to be manually actuated and connected to said movable element of said receiver so that upon said member being moved and held, upon said remote counter being out of synchronism with said master counter, said telemetric apparatus is unbalanced to cause said motor means to drive said remote counter into synchronism with said master counter and said clutching means is slipped so that said motor means is prevented from operating said receiver through said clutching means to rebalance said apparatus.

4. In combination: telemetric signal apparatus comprising a transmitter having a movable element, a receiver having a movable element, and motor means; a master counter; means driving said transmitter in synchronism with said master counter; load means comprising a remote counter; means connecting said motor means to said remote counter; means connecting said telemetric apparatus to said motor means so that said motor means is effective to drive said remote counter whenever said telemetric apparatus is unbalanced by movement of the movable element of said transmitter; first yieldable friction clutching means of the type which slips when the movement of the driven member is retarded by more than a predetermined force; means connecting said motor means to said movable element of said receiver through said first clutching means so that normally said motor means is effective to position said movable element to rebalance said apparatus; second non-yieldable clutching means; and a member designed to be manually actuated and connected to said movable element of said receiver through said second clutching means so that upon said member being moved and held, upon said remote counter being out of synchronism with said master counter, said telemetric apparatus is unbalanced to cause said motor means to drive said remote counter into synchronism with said master counter and said first clutching means is slipped so that said motor means is prevented from operating said receiver through said first clutching means to rebalance said apparatus.

MARVIN R. LAING.
WATT MYERS.

REFERENCES CITED

The following references are of record in the file of this patent:

UNITED STATES PATENTS

| Number | Name | Date |
|---|---|---|
| 2,425,605 | Edwards | Aug. 12, 1947 |
| 2,456,430 | Patterson et al. | Dec. 14, 1948 |